Oct. 14, 1930.  E. J. KEARNEY  1,778,260
MILLING CUTTER
Filed Feb. 1, 1926

INVENTOR
Edward J. Kearney
BY
Fred G. Parsons
ATTORNEY

Patented Oct. 14, 1930

1,778,260

UNITED STATES PATENT OFFICE

EDWARD J. KEARNEY, OF WAUWATOSA, WISCONSIN, ASSIGNOR TO KEARNEY & TRECKER CORPORATION, OF WEST ALLIS, WISCONSIN

MILLING CUTTER

Application filed February 1, 1926. Serial No. 85,209.

This invention relates to milling cutters and more particularly to cutters having inserted teeth or blades.

It is a purpose of the invention to provide an improved cutter of a construction which may easily and cheaply be manufactured and having inserted blades which are rigidly held in the body of the cutter to effectively resist any cutting strain to which the cutter may be subjected, yet may be readily replaced or adjusted therein.

The invention consists in the novel features of construction and in the peculiar arrangement and combination of parts, as hereinafter particularly described and claimed.

In the accompanying drawings the same reference characters are used for the same parts in each of the several views, of which:

Figures 4, 5:
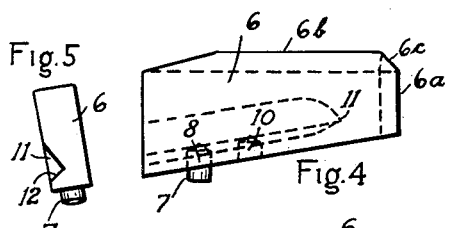
Figure 6:
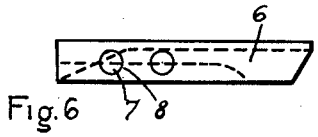

Figs. 4, 5, and 6 show projected views of one of the cutting blades.

Figure 2:
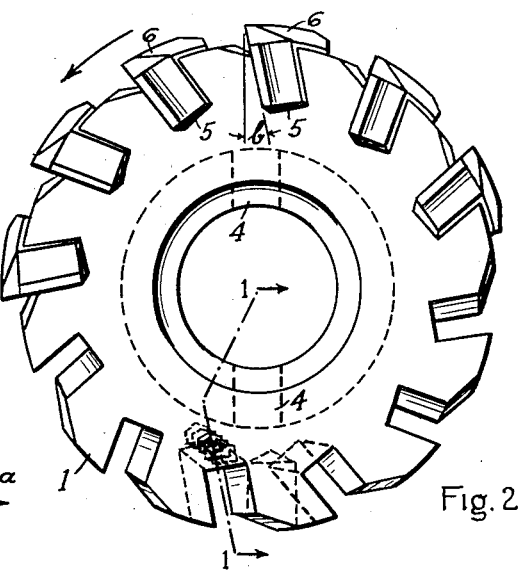
Fig. 2 is a front view of the same cutter with some of the blades removed.

A body or blade holder 1 is provided with a bore 2 and a portion 3 having a driving slot 4. The bore and slotted portion provide one of several well known means for supporting the cutter from the arbor or spindle nose of a machine tool and for driving it in this case in the direction of the arrow in Fig. 2.

The cutter body is provided at its circumference with a series of blade slots 5 all of which are similar, in which are closely but removably fitted a series of similar cutting blades 6. Each of the blades 6 is provided with an end cutting edge $6^a$, a peripheral or side cutting edge $6^b$, and a chamfered corner cutting edge $6^c$, such cutting edges being given suitable clearance in the usual manner so that during the revolution of the cutter the blade portions behind the cutting edges do not drag on the work surfaces just finished by the cutting edge.

Figure 1:
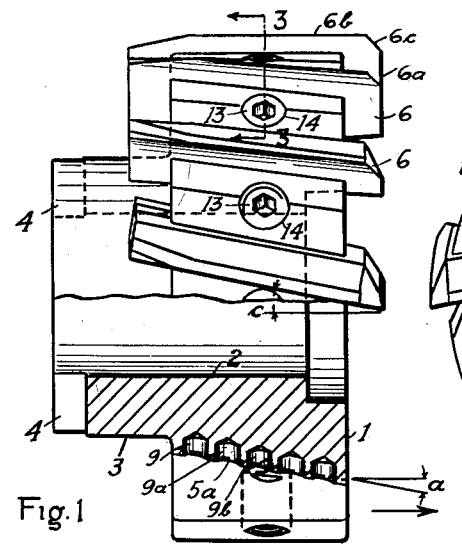
Fig. 1 shows a side view partly in section along line 1—1 of Fig. 2 of a milling cutter in which my invention is embodied.

The bottom face $5^a$ of each of the blade slots is set at an angle $a$ relative to the axis of the cutter revolution and the blades are formed to seat against the angular face $5^a$ when the cutting edge $6^b$ is parallel to the cutter axis so that when the blades are set forward in the direction of the arrow in Fig. 1 the cutting edges $6^b$ will describe a larger radius. Thus when the cutting edges $6^b$ become dull through use, the blades may be set forward a sufficient amount and reground to the original cutting diameter.

The side faces of the blade slots are parallel and inclined in two directions relative to the axis of cutter revolution. The one inclination is illustrated as angle $b$ in Fig. 2 and such inclination provides a forward rake for the cutting blade whereby the forward face of the blade material supporting the cutting edges $6^b$ will meet the work material at a substantial angle and the blades may be forced through the work material with less resistance, and also provides a shearing action for the cutting edges $6^a$ resulting in less vibration or shock when the blades meet the work material. The other direction of inclination of the sides of the blade slots relative to the axis of cutter revolution is illustrated by angle $C$, Fig. 1. This inclination provides a forward rake for the cutting blade whereby the forward face of the blade material supporting the cutting edge $6^a$ will meet the work material at a substantial angle and also provides a shearing action for the cutting edge $6^b$.

The resistance to removal of the work material tends to force the cutting blades back in the body in a direction opposite to the arrow shown in Fig. 1 and to prevent such blade movement the blades are each provided with a key 7 removably fixed in a suitable configuration 8 in the blade. A portion of key 7 projects from the blade to enter one of a series of configurations 9, $9^a$, etc., provided in the cutter body. The keys 7 in this instance are short round pins and the configurations 8, 9, etc., are bores suited to receive the round pins, but other types of key with other suitable configurations may be used. The keys 8 are ordinarily positioned to fit into the rear configurations 9 when new blades are first inserted in the cutter body but as the cutting edges are dulled through use the blades are set forward in the direction of the arrow in Fig. 1, the keys then entering one of the other configurations as 9ª for instance, when the dulled cutting surfaces may be ground to sharpen them while still maintaining a sufficient projection of the cutting edges from the body portion of the cutter.

The configurations 9, 9ª, etc., are equally spaced and at a distance as small as will leave sufficient metal between the bores to resist the cutting strains mentioned, but the smallest possible spacing still results in some cases in moving the blades forward by too great an amount. The blades are therefore each provided with another configuration 10 suited to receive key 7 and spaced apart from the configuration 8 by an amount different from the spacing of the configurations 9, 9ª, etc. In this instance the configurations 8 and 10 are spaced apart at approximately one and one-half times the spacing of the configurations 9, 9ª, etc. By this construction if it is undesirable to move a blade forward the full amount of the spacing of configurations 9, 9ª, the key 7 is removed from bore 8 and placed in bore 10. If the key had previously entered bore 9 for instance the blade would now be assembled to enter the key in bore 9ᵇ to position the blade forward by an amount equal to one half the spacing of the bores of the series 9, 9ª, etc.

It is obvious that the described construction is equally applicable for blade movement in the other direction if it is desired that the relative position of the cutting edges should be changed to have less projection from the cutter body.

Figure 3:
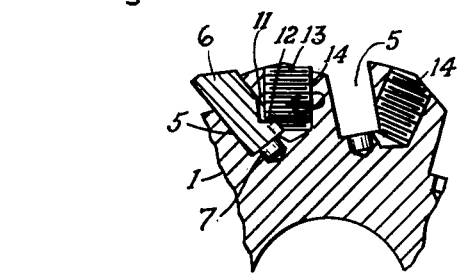
Fig. 3 is a partial section along line 3—3 of Fig. 1 in which one of the blade slots is shown with a cutting blade inserted and another without the blade.

The blades are each provided with an elongated notch or groove 11 having a face or surface 12 adapted to act as an abutment for screws 13 which are located in suitable threaded bores 14 in the cutter body, the threaded bores being positioned to break through into the blade slots as illustrated in Fig. 3, so that the ends of the screws 13 may engage with the surface 12 and the notches 11 being elongated to provide an abutment for the screws in all positions of blade adjustment. The screws 13 tend to force the blades against the bottom of the blade slots as the screws are rotated to move forward in the threaded bores. The contact of the screw with the abutment surface 12 is spaced substantially distant from the axis of the screw rotation and the arrangement of the parts is such that the frictional engagement of the screw with surface 12 as it is rotated to move it forward in its threaded bore tends to move the blade rearward in the direction opposite to the arrow in Fig. 1, thus seating the blade firmly against the key 8 and seating the key firmly against the particular configuration in the cutter body in which it may be entered. From the above it will be seen that the action of screws 13 is to simultaneously seat the blades firmly against the several resisting surfaces against which they would eventually be forced by the resistance of the work material against the several cutting edges. In this case the screws and their threaded bores are provided with right hand threads, the screws thus being turned in the direction of the arrow shown in Fig. 3 for tightening. Though the position shown is preferable the screws and notches 11 might have been positioned on the forward side of the blades in which case the contact of the screws and abutting surfaces 12 would be on the opposite side of the screw axis and left hand threads for the screws and threaded bores would then be used to force the blades in the same direction, the screws then being turned in the opposite direction for tightening.

It is to be understood that my invention herein illustrated in a preferred form may in the light of this disclosure be embodied in a variety of equivalent forms, each within the spirit and scope of the following claims.

I claim:

1. In a milling cutter the combination of a rotatable body member provided with a plurality of axially extended blade slots; each of said slots having associated therewith a blade member fitted therein for adjustment axially of said body, and means for retaining each of said blades in various positions of adjustment including for each blade, a series of spaced configurations in one of said members, a plurality of configurations in the other of said members and having a spacing different from the spacing of the configurations of said series, and a key engaging simultaneously with a configuration in each of said members, said key being adapted to engage the one or the other of said plurality of configurations for the purpose of relative member adjustment in an amount less than the spacing of configurations in said series.

2. In a milling cutter the combination of a body provided with a plurality of blade slots; each of said slots having associated therewith a blade fitted therein, a plurality of spaced configurations in said body, a plurality of configurations in said blade having a spacing different from the spacing of the body configurations, a key engaging simultaneously with a configuration in said blade and with another in said body and a screw threaded in said body and adapted when advanced in its threaded bore to simultaneously force said blade against the bottom of the slot and in the direction of the cutting pressure against the end of the blade.

3. In a milling cutter the combination of a body having a slot, a blade fitting therein; the forward side of said slot being tilted relative to the axis of cutter rotation in a direction such that a blade face fitting against said forward side is positioned to have a forward rake, a key associated with said blade, a configuration in said body adapted to receive a projecting portion of said key, and a screw engaging a threaded bore in the body portion adjacent the other side of said slot and positioned to contact said blade when rotated to advance along said threaded bore whereby to force said blade against the bottom of said slot, the point of such contact being materially distant from the axis of screw rotation whereby such screw movement tends to move the blade in the direction of cutting pressure against the end of the blade.

4. In a rotatable milling cutter the combination of a rotatable body member provided with an axially extended blade slot, a blade member fitted in said slot for adjustment in the direction of the axis of said cutter; and means for retaining said blade in various positions of said adjustment including a series of spaced configurations in one of said members, a plurality of configurations differently spaced in the other of said members, a key simultaneously engaging a configuration in each of said members, and means for urging said blade in the direction of the bottom of said slot and simultaneously in axial direction.

In witness whereof I hereto affix my signature.

EDWARD J. KEARNEY.